Sept. 8, 1959 L. F. PEROTTE 2,903,632

SELENIUM CELLS

Filed June 17, 1958

Inventor:
Laurence F. Perotte
by William D. Roberson
His Attorney

United States Patent Office 2,903,632

Patented Sept. 8, 1959

2,903,632

SELENIUM CELLS

Laurence F. Perotte, Arlington, Mass., assignor to General Electric Company, a corporation of New York Application June 17, 1958, Serial No. 742,557

7 Claims. (Cl. 317—241)

Figures 1, 2:
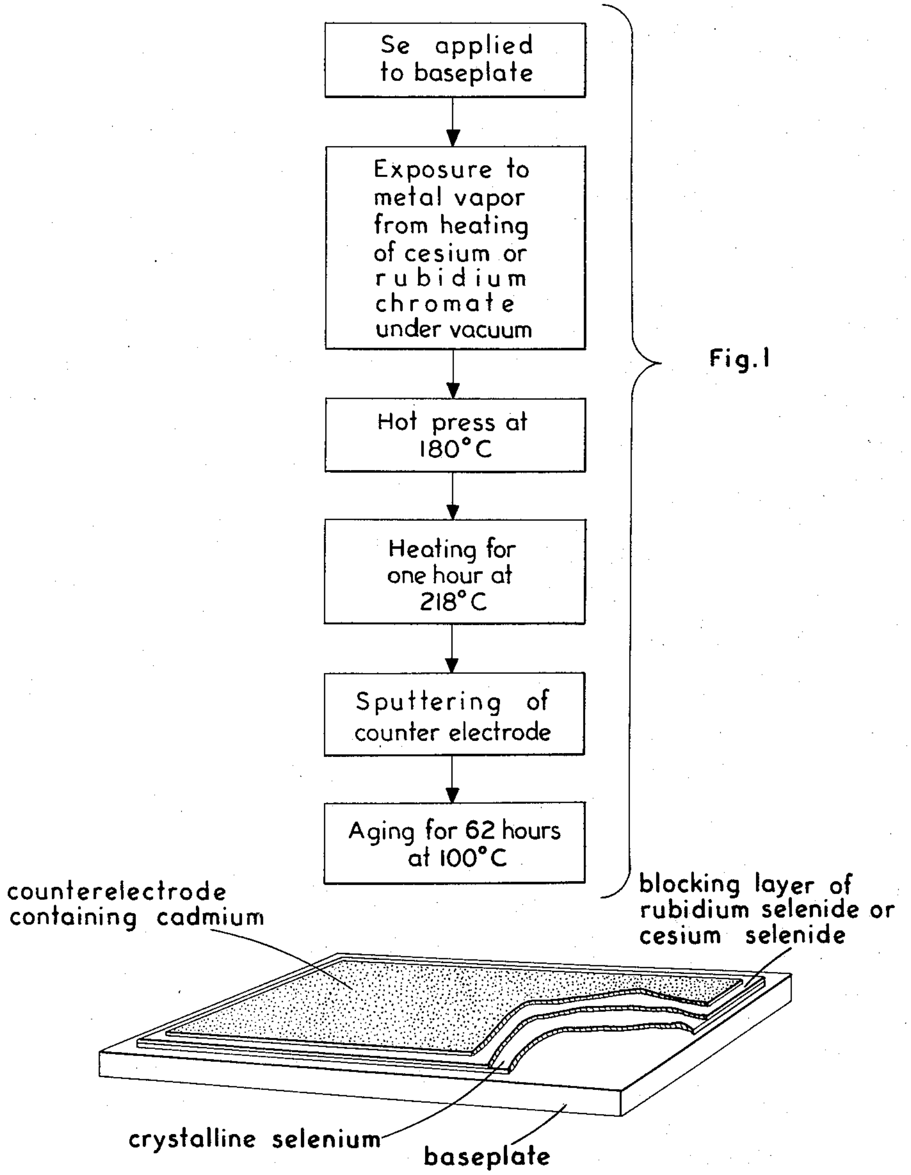

This invention relates to unilaterally conducting electric circuit elements and, more particularly, to selenium photovoltaic and rectifier cells having improved electrical characteristics.

Alternating current rectifiers which utilize the unidirectional conducting characteristics of selenium are commonly produced by applying at least one thin layer of selenium to a base plate, which also serves as an electrode, by forming a barrier layer atop the selenium, and by affixing a counterelectrode to the assembly. Photovoltaic cells may be manufactured in a like manner with the counterelectrode being of a light-transmitting character.

It is an object of this invention to provide unilaterally conducting selenium cells in which the ratio of blocking resistance to forward resistance is greatly increased through the use of an improved blocking layer.

It is a further object of this invention to provide an improved method of manufacturing selenium cells with blocking layers.

By way of a summary account of the practice of this invention in one of its aspects I first deposit a uniform thickness of selenium upon an electrode forming a base plate, preferably of iron. Thereafter I produce on the exposed surface of the selenium a thin layer either of rubidium or of cesium, which because of their extremely electropositive character react with the selenium to form a blocking layer of rubidium selenide or of cesium selenide respectively. The cell is then hot-pressed and heat treated at an elevated temperature, and thereafter a counterelectrode consisting of alternate layers of cadmium and platinum is sputtered onto the surface of the cell. Photovoltaic selenium cells so treated have a greatly increased voltage output upon exposure to light, while selenium rectifiers treated with rubidium or cesium withstand voltages up to 76 percent higher than untreated cells and possess about half the capacitance of such cells. In addition, the so-called forming step in which selenium rectifiers are subjected to reverse currents to develop their p-n junction requires but a fraction of the time needed by standard untreated rectifiers, and is of the order of minutes instead of hours. Whether photovoltaic or rectifier, selenium cells processed according to these teachings have very high blocking resistances.

Although the features of this invention which are believed to be novel are set forth in the appended claims, additional details as well as further objects and advantages may perhaps be more readily understood through reference to the following description taken in connection with the accompaniyng drawings, wherein:

Figure 1 is a block diagram of one type of process employed in the production of the improved selenium cells according to this invention; and Figure 2 is an isometric view, partially cut away, of a selenium photovoltaic cell constructed according to the present teachings.

In carrying out the present teachings I prefer first to evaporate onto clean iron base plates a thin amorphous film of selenium of a thickness ranging from .006 to .008 inch thick. The cells are then placed in a vacuum chamber and arranged equidistant around a metal evaporator in such a way that the selenium surfaces face the evaporator. A small quantity of a decomposable salt, either of cesium or of rubidium, is placed in the evaporator, and the chamber is evacuated to a pressure of .05 micron or less. The salt selected is preferably a chromate either of cesium or of rubidium, although good results are also obtainable with the use of the hydride of these metals. Upon heating to a temperature of about 950° C. the salt is decomposed, thus releasing the metal vapor which readily deposits on and reacts with the selenium forming a thin blocking layer of selenide on the selenium cell. This operation is carried out in a vacuum to prevent the prior oxidation of the cesium or rubidium vapors by oxygen or another oxidizing agent before the selenide can be formed.

The cells are then removed from the vacuum chamber and placed in a hot press maintained at a temperature of about 180° C., and the selenium is pressed to a thickness of from .002 to .003 inch. After pressing, the cells are placed in an oven maintained at a temperature of about 218° C. for one hour, during which time a crystallization of the previously amorphous selenium takes place. Cells whose surfaces have not been treated with cesium or rubidium vapor have a gray, rough appearance after the crystallizing treatment; whereas cells treated in the manner herein described are recognizable by their dark, glossy appearance and by the formation of larger selenium crystals. After the crystallization process is completed, a counterelectrode consisting of alternate layers, first of cadmium, and then of platinum, is sputtered onto the surface of the cells, which are then aged for a period of sixty-two hours at about 100° C. to ensure stable characteristics.

The comparative tabulation below gives the electrical characteristics of samples of otherwise identical selenium photovoltaic cells made with and without the selenide blocking layer described. The values given are averages of measurements taken on a representative number of cells, and the potential as well as the current measurements were made at 60 footcandles illumination.

| Blocking layer | Open circuit potential (millivolts) | Current with 300 ohm load (microamperes) | Blocking resistance (ohms) | Forward resistance (ohms) |
|---|---|---|---|---|
| Standard cell | 290 | 240 | 80,000 | 550 |
| Rubidium selenide | 390 | 210 | 530,000 | 650 |
| Cesium selenide | 375 | 200 | 400,000 | 460 |

Cells having blocking layers formed of other alkali selenides exhibit improved characteristics over those of untreated cells, but in no case do they possess blocking resistances or open circuit voltages commensurate with those of cells treated with rubidium or cesium.

Selenium photovoltaic cells treated in the manner described above produce unusually high potentials when exposed to light, as can be seen from the comparison above, and have a markedly improved efficiency in converting light energy to electrical energy. Consequently, the power output is increased. In addition, it will be noted that although the blocking layer has increased the blocking resistance by a factor 5 the forward resistance is only slightly higher than that of the untreated cells. The increase in voltage can be attributed to the elimination of internal short circuits in the cell, and the slight decrease in current output is probably due to an increase in the absorption of the incident light, thus reducing the amount of light arriving at the p-n junction.

Although the blocking layer may be formed either of cesium selenide or of rubidium selenide, I prefer the latter, principally because of the somewhat higher potential output of the cell when it is constructed as a photovoltaic cell. The developed potentials of cells employing a rubidium selenide blocking layer tend to be approximately four percent higher than those of cells having a cesium selenide blocking layer.

Certain variations in the processing described are permissible without departing from the use of this invention in its broader aspects. Thus, although I prefer to evaporate the initial selenium layer onto the conducting base to produce a uniform amorphous layer, other well known methods of placing the selenium on the base may be employed, such as hot dipping the base in a molten bath of selenium and then spinning it to throw off the excess of selenium while molten by centrifugal force. In addition, it may be preferred to carry out the hot pressing of the cell before instead of after the application of the rubidium or cesium layer. Especially in the case of rectifier cells, various materials may be added to the selenium to increase its conductivity and otherwise to impart desired characteristics. Furthermore, additional blocking layers, in combination with the rubidium selenide or cesium selenide, may further enhance the nature of the p-n junction. The particular examples given should, therefore, be taken as illustrative in nature, and the scope of these teachings should not be limited except by a fair interpretation of the appended claims.

What I claim as new and desire to secure by Letters Patent of the United States is:

1. A unilaterally conducting circuit element comprising an electrode having a layer of crystalline selenium deposited on a portion of its surface, a counterelectrode for making electrical contact with said selenium layer, and a blocking layer interposed between said selenium layer and said counterelectrode formed from one of the materials from the group consisting of rubidium selenide and cesium selenide.

2. A unilaterally conducting circuit element comprising an electrode having a layer of crystalline selenium deposited on a portion of its surface, a counterelectrode for making electrical contact with said selenium layer, and a blocking layer of rubidium selenide interposed between said selenium layer and said counterelectrode.

3. A unilaterally conducting circuit element comprising an electrode having a layer of crystalline selenium deposited on a portion of its surface, a counterelectrode for making electrical contact with said selenium layer, and a blocking layer of cesium selenide interposed between said selenium layer and said counterelectrode.

4. A unilaterally conducting electric circuit element comprising an electrode having a layer of crystalline selenium deposited on a portion of its surface, a blocking layer formed on said selenium layer and comprising one of the materials from the group consisting of rubidium selenide and cesium selenide, and a conducting counterelectrode superposed on said blocking layer.

5. In a method of producing blocking layer devices including a selenium layer, the step which comprises evaporating onto said selenium layer in the absence of air a small quantity of one of the metals from the group consisting of cesium and rubidium.

6. The method of producing a unilaterally conducting circuit element which comprises forming a uniform layer of selenium on an electrically conducting electrode, depositing on the free surface of said selenium layer a thin coating of a material from the group consisting of cesium and rubidium to form a blocking layer including the reaction product of said thin coating with said selenium, and forming a counterelectrode on said blocking layer.

7. The method of producing a unilaterally conducting circuit element having a selenium layer, which includes applying a blocking layer comprising one of the materials from the group consisting of cesium selenide and rubidium selenide by evaporating onto said selenium layer one of the materials from the group consisting of cesium and rubidium and forming a counterelectrode upon said blocking layer.

References Cited in the file of this patent

UNITED STATES PATENTS

| | | |
|---|---|---|
| 1,751,361 | Ruben | Mar. 18, 1930 |
| 2,510,361 | Addink | June 6, 1950 |